US012580119B2

(12) United States Patent
Haubold et al.

(10) Patent No.: US 12,580,119 B2

(45) Date of Patent: Mar. 17, 2026

(54) HOUSING FOR A PLUG-IN COIL ELEMENT, PLUG-IN COIL ELEMENT, AND PANE

(71) Applicant: FEW Fahrzeugelektrik Werk GmbH & Co. KG, Zwenkau (DE)

(72) Inventors: Sebastian Haubold, Leipzig (DE); Peter Thomas Krabs, Leipzig (DE); Ying Leibnitz, Leipzig (DE); Bernhard Reul, Herzogenrath (DE); Hadi Rastegar, Aachen (DE); Francois Hermange, Aachen (DE)

(73) Assignee: FEW Fahrzeugelektrik Werk GmbH & Co. KG, Zwenkau (DE)

( * ) Notice: Subject to any disclaimer, the term of this patent is extended or adjusted under 35 U.S.C. 154(b) by 924 days.

(21) Appl. No.: 17/858,226

(22) Filed: Jul. 6, 2022

(65) Prior Publication Data

US 2023/0011519 A1 Jan. 12, 2023

(30) Foreign Application Priority Data

Jul. 6, 2021 (DE) ......................... 102021117373.6

(51) Int. Cl.

*H01F 27/29* (2006.01)
*H01F 27/02* (2006.01)
*H01R 33/02* (2006.01)

(52) U.S. Cl.

CPC ............. *H01F 27/29* (2013.01); *H01F 27/02* (2013.01); *H01R 33/02* (2013.01); *H01R 2201/26* (2013.01)

(58) Field of Classification Search

CPC ......... H01F 27/29; H01F 27/02; H01R 33/02; H01R 2201/26

(Continued)

(56) References Cited

U.S. PATENT DOCUMENTS 9,349,527 B2 * 5/2016 Trinh ...................... H01F 27/04
9,707,807 B2 * 7/2017 Summers ................ H01F 27/02

(Continued)

*Primary Examiner* — Gary F Paumen

(74) *Attorney, Agent, or Firm* — Bodner & Bodner, PLLC; Christian P. Bodner; Gerald T. Bodner

(57) ABSTRACT

The invention relates to a housing (20) for electrically isolating and mechanically stabilizing a plug-in coil element (10), wherein the plug-in coil element (10) has a coil (13) having a winding body (30), a first coil end (15) and a second coil end (16), as well as a first connecting element (11) for electrically connecting to a connecting element along a plug-in direction (S), and a second connecting element (12) for electrically connecting along the plug-in direction (S), wherein the winding body (30) has a first winding body end (31) and a second winding body end (32), and the first coil end (15) is formed to be spaced from the first winding body end (31), and the second coil end (16) is formed to be spaced from the second winding body end (32), wherein the first connecting element (11) is connected to the first coil end (15), and the second connecting element (12) is connected to the second coil end (16), moreover having protruding from a housing opening (39) to the outside, a sheathing portion (21) surrounding the first connecting element (11) at least in portions, a first housing portion (22) surrounding the second connecting element (12) at least in portions, a guiding device (23) arranged at an outer surface of the housing (20) for guiding the housing (20) during an assembly in parallel to the plug-in direction (S), and an arresting device (24) arranged at the outer surface for arresting the housing (20) in parallel to the plug-in direction (S).

13 Claims, 3 Drawing Sheets

Figure 1A:
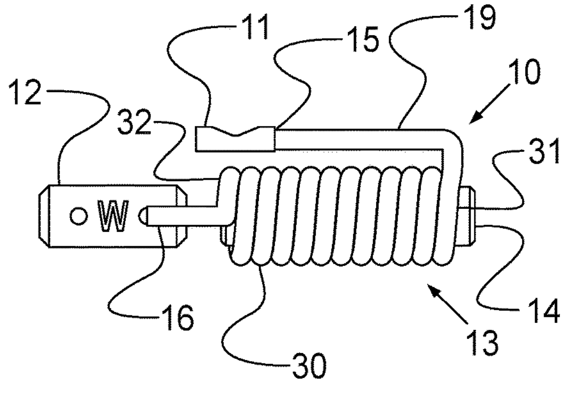

(58) Field of Classification Search
USPC .......................................................... 439/194
See application file for complete search history.

(56) References Cited

U.S. PATENT DOCUMENTS

| | | | | |
|---|---|---|---|---|
| 9,767,952 | B2 * | 9/2017 | Hamamura ............ | G01R 33/04 |
| 10,839,999 | B2 * | 11/2020 | Cayton ................. | H01F 27/402 |
| 2012/0038444 | A1 * | 2/2012 | Wu ......................... | H01F 27/02<br>336/90 |
| 2015/0206650 | A1 * | 7/2015 | Trinh ...................... | H01F 38/30<br>336/192 |
| 2015/0375579 | A1 * | 12/2015 | Summers ................ | H01F 27/02<br>301/5.1 |
| 2018/0350512 | A1 * | 12/2018 | Yang ....................... | H01F 27/22 |
| 2020/0112259 | A1 * | 4/2020 | Liffran .................... | H01F 27/29 |

* cited by examiner

HOUSING FOR A PLUG-IN COIL ELEMENT, PLUG-IN COIL ELEMENT, AND PANE

The invention relates to a housing of a plug-in coil element according to the feature combination of claim 1. Furthermore, the invention relates to a plug-in coil element having a housing, according to claim 10. Further, the invention relates to a pane, in particular a vehicle pane, having a plug-in coil element, according to claim 13.

It is known that panes, in particular vehicle panes, are increasingly equipped with electrical connecting elements. The panes have in this case an electrically conductive structure such as, for example, heating conductors or antenna conductors. By means of the electrical connecting element, this electrically conductive structure can be connected to a supply voltage and, if necessary, to onboard electronics of the vehicle. For connecting the electrical connecting element, for example, plug-in coil elements can be used as counterparts.

When establishing the electrical contact of the electrical connection of the pane to the supply voltage or the onboard electronics of a vehicle, for example, by means of a plug-in coil element, the construction of the electrical connection and sometimes of the plug-in coil element can be slightly deformed.

It is furthermore known that the risk is important that a plug-in coil connection to be established or established can be loosened by deformation. This could lead to the fact that the electrical contact or the electrical current conduction could result in overheating effects at mechanically damaged points and therefrom resulting damages and function failures of the electrically contacted panes.

In this light, it is a task of the present invention to propose a housing for a plug-in coil element, wherein the housing is intended to protect the plug-in coil element in the best possible manner. The housing should moreover be easy to manufacture.

It is further a task of the present invention to propose a further developed plug-in coil element having a housing.

It is moreover a task of the present invention to propose a pane, in particular a vehicle pane, which is further developed with respect to the electrical contact establishment.

According to the invention, this task is solved with regard to a housing for a plug-in coil element by the subject matter of claim 1, with regard to a plug-in coil element having a housing, by the subject matter of claim 10, and with regard to a pane, in particular a vehicle pane, by the subject matter of claim 13.

Advantageous further developments will result from the claims.

The task of the invention is in particular solved by a housing for electrically isolating and mechanically stabilizing a plug-in coil element, wherein the plug-in coil element has a coil having a winding body, a first coil end, and a second coil end, as well as a first connecting element for electrically connecting to a connecting element along a plug-in direction, and a second connecting element for electrically connecting along the extension.

The winding body has a first winding body end and a second winding body end.

The first coil end is formed to be spaced from the first winding body end, and the second coil end is formed to be spaced from the second winding body end.

The first connecting element is connected to the first coil end, and the second connecting element is connected to the second coil end.

The housing moreover has:

- protruding from a housing opening to the outside, a sheathing portion surrounding the first connecting element at least in portions,
- a first housing portion surrounding the second connecting element at least in portions,
- a guiding device arranged at an outer surface of the housing for guiding the housing during an assembly in parallel to the plug-in direction, and
- an arresting device arranged at the outer surface for arresting the housing in parallel to the plug-in direction.

By means of the housing according to the invention for electrically isolating and mechanically stabilizing the plug-in coil element, the plug-in coil element is stiffened in itself. At the same time, the plug-in coil element is stabilized against manipulations or environmental influences acting from outside.

The housing in particular causes a mechanical stabilization on loaded points of the plug-in coil element. In addition, individual portions of the housing contribute for sealing as well as electrically isolating the plug-in coil element.

The plug-in coil element basically is formed as a coil having two coil ends. The coil has a winding body having a first coil end and a second coil end.

The first coil end is in this case formed to be spaced from the first winding body end. The second coil end is formed to be spaced from the second winding body end. In other words, the first winding body end has a first coil end assigned, and the second winding body end has the second coil end assigned.

The first winding body end, however, does not correspond to the first coil end. The second winding body end does not correspond to the second coil end. Between each of the first winding body end and the first coil end, as well as between the second winding body end and the second coil end, a coil portion or coil wire portion is rather formed, which is preferably not wound.

Preferably, these coil portions are not wound in the direction of the winding body.

The two coil ends each are connected to a connecting element. The first connecting element is connected to the first coil end. The second connecting element is connected to the second coil end.

The first connecting element is at least in portions surrounded by a sheathing portion. In a preferred embodiment of the invention, the first connecting element is completely surrounded by the sheathing portion at least in the plug-in direction. The sheathing portion in this case does not rest completely against the first connecting element. Preferably, the sheathing portion is spaced from the first connecting element at least in portions. Preferably, the sheathing portion is spaced from the first connecting element such that a plug-in coil connection can be formed.

The housing moreover has a first housing portion surrounding the second connecting element at least in portions.

Preferably, the first housing portion surrounds the second connecting element only in portions. In this preferred embodiment of the invention, the second connecting element is not surrounded by the first housing portion in portions.

It is possible for the second connecting element to protrude from the first housing portion to the outside with the front end of the second connecting element. This enables the second connecting element to be contacted in particular in a simplified manner.

At an outer surface of the housing, a guiding device for guiding the housing during an assembly in parallel to the plug-in direction is formed. Preferably, the guiding device is formed at a housing bottom side of the housing. As a housing bottom side of the housing, preferably such an outer surface is to be understood, which forms the side of the housing pointing towards a pane in case of application.

Preferably, the guiding device is formed as a bevelled portion of the housing. By means of this bevel, the housing during assembly may be guided first along a bridge-shaped contact part. Due to a bevelled housing portion, the assembly in the plug-in direction is thus facilitated.

In addition, the housing has an arresting device at the outer surface. Preferably, the arresting device is formed at the housing bottom side of the housing. As the lower side, the side of the housing pointing towards the pane in the mounted state is to be understood.

The arresting device may, for example, be formed like a stop element. By means of the arresting device, a limitation with respect to the further displacement or movement of the housing in the plug-in direction is inhibited. As soon as the arresting device, in particular the stop element, rests against a counterpart of the electrical connection of the pane, a further displacement or movement of the housing having the plug-in coil element located therein, is prevented, in particular in the plug-in direction.

By means of the arresting device, warping of the plug-in coil element as well as warping of an electrical connection of a pane formed complementarily to the plug-in coil element is effectively prevented.

On the housing bottom side, preferably, an attenuation surface is formed for mounting an attenuation element. The attenuation element is formed from a soft material, preferably, from a rubber material or a felt material.

It is possible for the attenuation surface to be formed as a surface protruding beyond the housing bottom side. This facilitates mounting and positioning of an attenuation element.

It is furthermore possible for the attenuation surface to be formed to be structured or roughened, so that a particularly good connection can be established permanently between the attenuation element and the attenuation surface.

The attenuation element preferably is applied to the attenuation surface by means of adhesive connecting technology. This is a particularly simple connecting technology.

The attenuation element preferably rests against a pane, in particular, a vehicle pane, in a state of the plug-in coil element connected to an electrical connection of the pane. Due to forming an attenuation element, a possible vibration of the housing and rubbing of the housing at the pane is prevented or at least attenuated and minimized, respectively.

The sheathing portion preferably is formed from a shrinking tube material, in particular of polyolefin.

The sheathing portion, which is preferably formed from a shrinking tube material, protects the first connecting element, on the one hand, from environmental influences. On the other hand, the formation of a sheathing portion of a shrinking tube material causes a protection of the first connecting element from casting compound during the manufacturing process of the housing.

The housing preferably is formed as an injection-moulded part. Prior to the injection moulding process, the sheathing portion is pushed at least in portions, preferably completely, over the first connecting element, so that the first connecting element will not be coated with an injection moulding material subsequently in an injection moulding process.

In a further embodiment of the invention, the guiding device and the arresting device form a second housing portion of the housing.

The second housing portion preferably is formed as a substantially wedge-shaped portion. The second housing portion preferably protrudes form the housing bottom side. Preferably, the second housing portion is formed from a solid material or a monolithic material, so that the second housing portion is of a particularly stable configuration.

In a further embodiment of the invention, a third housing portion may be formed in the area between the sheathing portion and the first winding body end, which third housing portion surrounds a coil wire portion extending from the first coil end up to the first winding body end.

The coil wire portion thus is not a part of the winding body. On the contrary, the part of the coil wire is to be understood as a coil wire portion enabling a spaced arrangement of the first coil end to the first winding body end. The coil wire is in particular at least once bent by about 90°, so that the first coil end is formed at the level of the second winding body end. Preferably, the coil wire has at least one bending enclosing an angle of 70° to 100°, in particular of 75° to 89°.

As a formation at the level of the second winding body end, such an arrangement of the first connecting element is to be understood, according to which the first connecting element rests upon a parallel line to the longitudinal axis of the winding body, wherein the position of the first connecting element rests upon a perpendicular line to the longitudinal axis of the winding body, which perpendicular line preferably also intersects the second winding body end.

Due to the formation of a third housing portion, the connecting portion between the first coil end and the first winding body end is in particular stiffened and additionally protected from environmental influences. This results in an effective reinforcement of the plug-in coil construction.

The first housing portion extends preferentially starting from the second connecting element at least up to the second winding body end. Thus, this connection portion between the second winding body end and the connecting element is also constructively reinforced and correspondingly protected from environmental influences.

The first housing portion surrounds the second connecting element at least in portions, so that the second connection element, too, is constructively reinforced. Warping of the second connecting element is effectively prevented due to forming the first housing portion, since the second connecting element is not formed as a freestanding element but is correspondingly supported by the first housing portion.

The sheathing portion surrounding the first connecting element at least in portions, preferably is formed at least in portions at the level of the second winding body end. This is in particular the result if the first connecting element is formed at the level of the second winding body end. With respect to the position indication “at the level of the second winding body end”, reference is made to the preceding explanations in this case.

The sheathing portion has an access opening. The access opening preferably points into the plug-in direction.

The two connecting elements of the plug-in coil element preferably are formed such that each of them points into the plug-in direction. This enables the plug-in coil element to be especially simply mounted, since due to a movement of the housing in the plug-in direction, both the first connecting element and the second connecting element are correctly positioned in relation to an electrical connection, in particular a pane, in a mounting movement. It is possible, that following this mounting movement, further mounting steps such as, for example, a crimp process, are performed or need to be performed.

The housing preferably is formed from plastics, in particular from polyamide. Particularly preferred, the housing is a plastic moulded part.

The coil of the plug-in coil element comprises at least one winding body of a current conductor made of wire, in particular of copper wire. For reinforcing the magnetic field generated by the coil, a coil support of a ferromagnetic material may be provided.

Preferably, the first coil end as well as the second coil end are guided in the direction in parallel to the middle axis of the winding body of the plug-in coil element. Preferably, the two coil ends point in this case in the same direction.

It is possible that the first coil end is connected to a plug-in sleeve by clamping or crimping or forms a plug-in sleeve due to clamping or crimping.

The second connecting element, on the contrary, may be formed as a flat plug, preferably as a vehicle flat plug, further preferentially as a standardized vehicle flat plug. Connecting cables to the onboard electronics may, for example, be plugged onto such a flat plug.

A further aspect of the invention relates to a plug-in coil element having a housing. The plug-in coil element has a coil having a winding body, a first coil end and a second coil end, as well as a first connecting element and a second connecting element, wherein the winding body has a first winding body end and a second winding body end, and the first coil end is formed to be spaced from the first winding body end, and the second coil end is formed to be spaced from the second winding body end, wherein the first connecting element is connected to the first coil end, and the second connecting element is connected to the second coil end, wherein the housing is a housing according to the invention. The plug-in coil element serves in particular for establishing an electrical connection for a vehicle pane.

In a particularly preferred embodiment of the invention, the first connecting element is formed as a plug-in sleeve. An electrical connecting element, in particular an electrical connecting element of a vehicle pane, preferably has a plug-in connection of contrary action, in particular a plug-in tongue, that is compatible to the plug-in sleeve.

The second connecting element of the plug-in coil element preferably is formed as a flat plug, in particular as a vehicle flat plug, particularly preferred as a standardized vehicle flat plug.

Alternatively, it is possible for the second connecting element of the plug-in coil element to be formed as a counterpart of a flat plug, in particular of a vehicle flat plug, particularly preferred of a standardized vehicle flat plug.

The second connecting element serves in particular for electrically contacting an electrical cable. This cable may, for example, establish a connection to an external functional element, a voltage supply or a receiving device. The connection between the second connecting element and a cable may be performed in different ways. It is performed, for example, by soldering, welding, screwing, by applying an electrically conductive adhesive or by means of a plug connection.

A further aspect of the invention relates to a pane, in particular a vehicle pane, comprising at least a substrate and an electrically conductive structure, wherein the electrically conductive structure is electrically contacted to at least one electrical connecting element, wherein the electrical connecting element is connected to a plug-in coil element according to the invention.

Preferably, the substrate contains glass, in particular preferred soda lime glass. The substrate may basically contain also other kinds of glasses, for example, quartz glass or borosilicate glass.

The substrate is preferably transparent or translucent. The substrate may basically have in addition an opaque, electrically non-conductive coating on its surface. The opaque, electrically non-conductive coating may be formed in particular like a frame at the outer edge of the substrate.

The electrically conductive structure may, for example, be applied onto the substrate by means of a screen print process. The electrically conductive structure preferably has a layer thickness of 5 μm to 40 μm, particularly preferred of 5 μm to 20 μm, particularly preferred of 10 μm to 12 μm. The electrically conductive structure preferably contains silver, particularly preferred silver particles and glass frits.

The pane may be an individual pane or a composite pane of two or more individual panes.

The invention will be described below also with respect to further features and advantages, which will be explained in more detail on the basis of the Figures.

It is obvious to the expert that some elements of the following description do not fall into the scope of protection of the claims. If such a discrepancy is present, this disclosure is to be understood as mere supporting information which is not part of the invention. The invention is only defined by the claims.

Figure 1B:
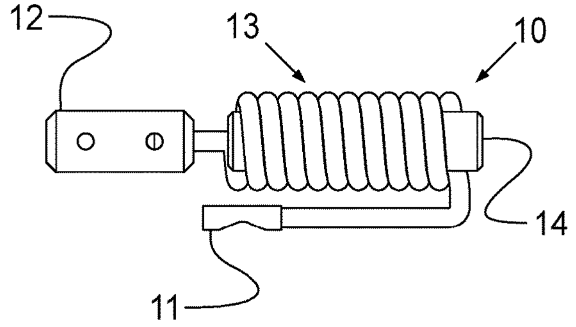
Figure 2:
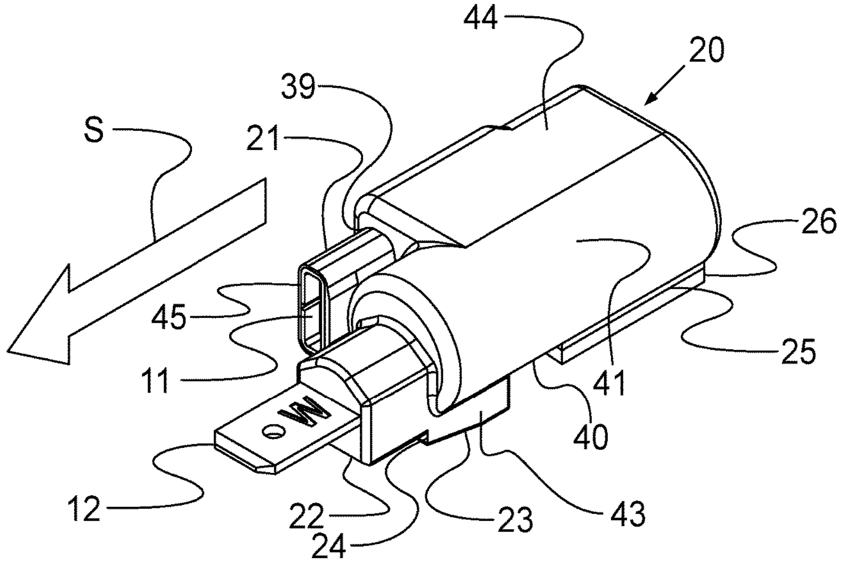
Figure 3:
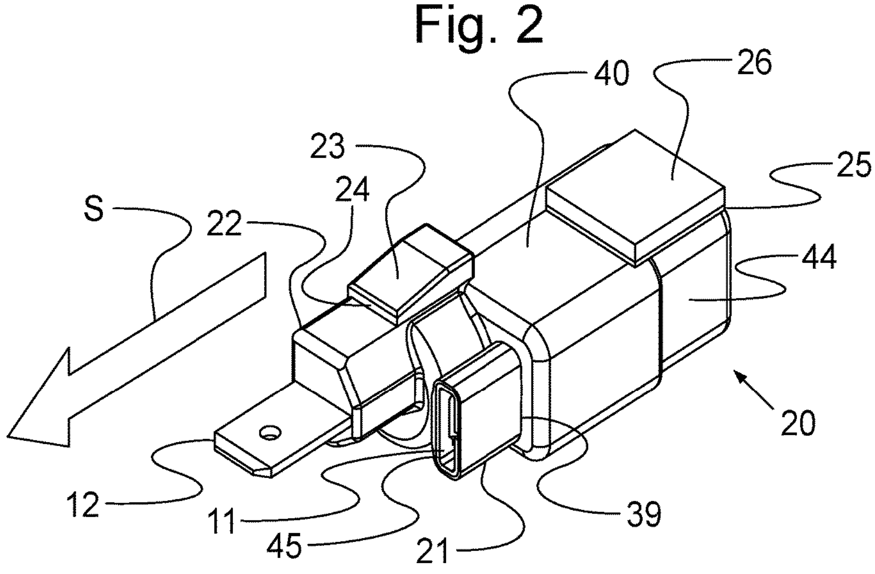
Figure 4:
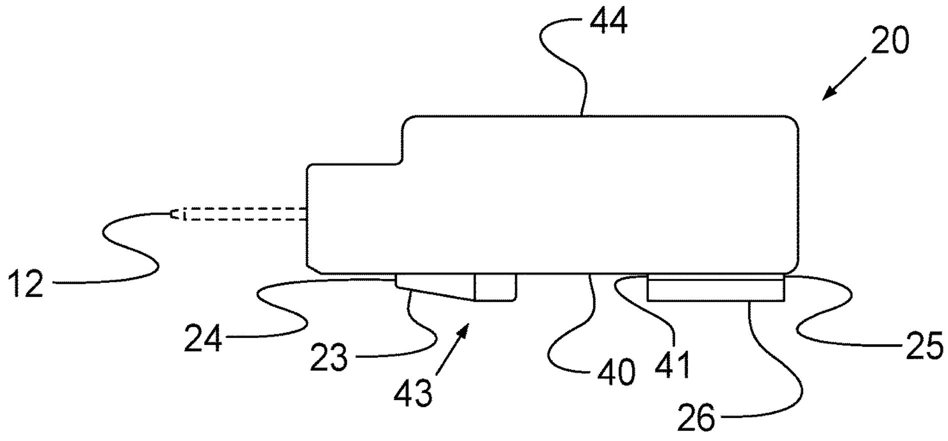
Figure 5:
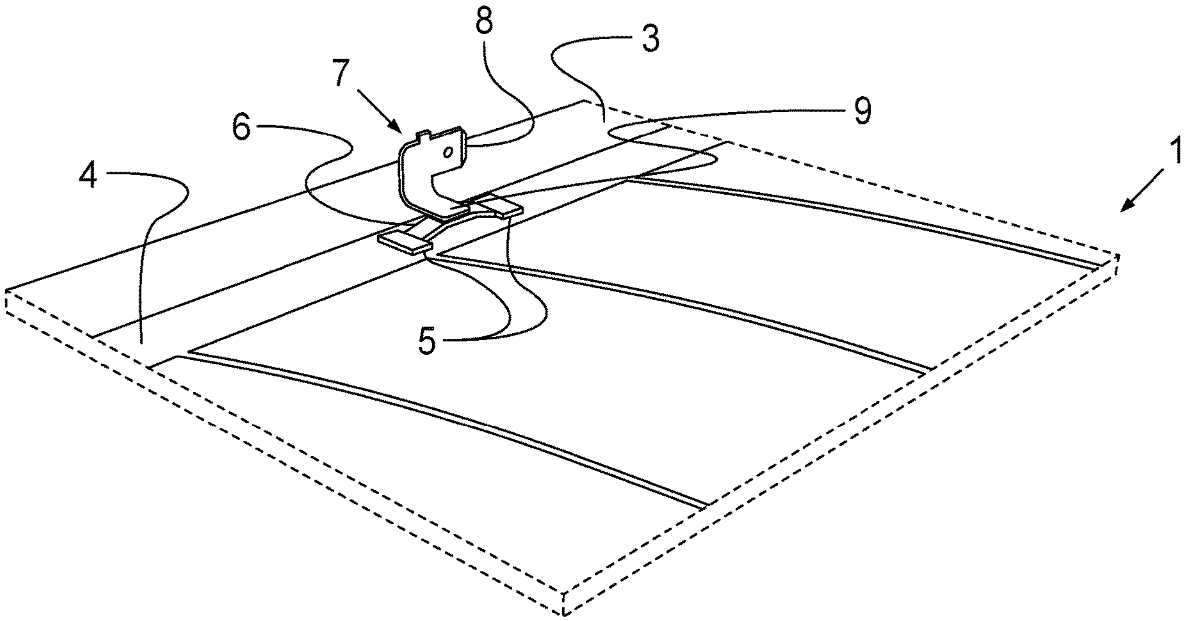

Shown are in the Figures:

FIGS. 1*a* and 1*b* various side views of a plug-in coil element according to the invention;

FIGS. 2 to 4 various views of a housing according to the invention of the plug-in coil element;

FIG. 5 a pane according to the invention, and

Figure 6:
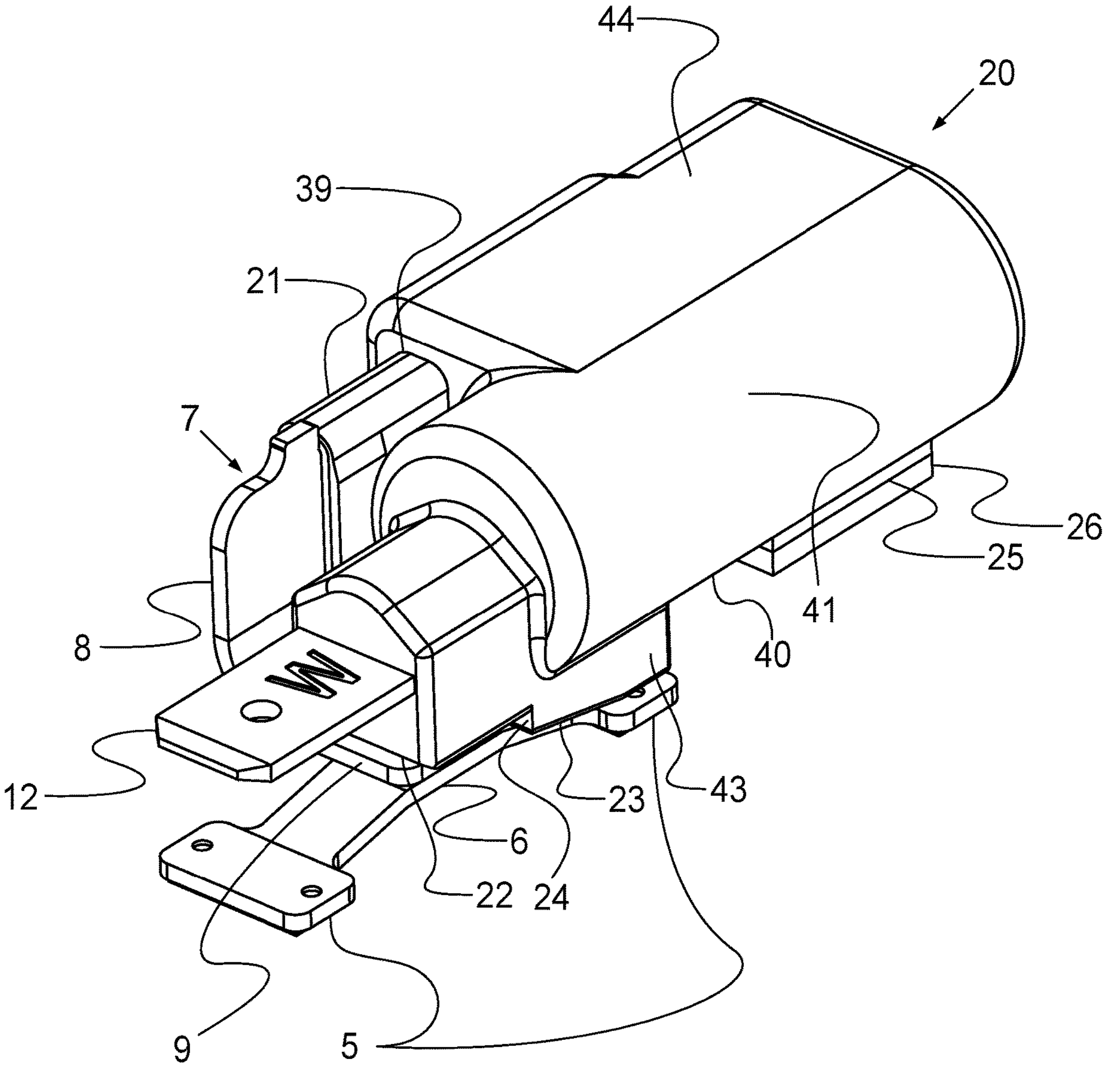

FIG. 6 a plug-in coil element according to the invention in the mounted state.

In the following, the same reference numerals will be used for equal components or components of equal action.

In the FIGS. 1*a* and 1*b*, the plug-in coil element 10 is illustrated without the associated portions of the housing 20 (see FIGS. 2 to 4). The plug-in coil element 10 has a coil 13 having a winding body 30 and a coil support 14. The coil 13 thus comprises a winding body 30 of a current conductor made of wire, in particular made of copper wire. The coil support 14 may be formed of a ferromagnetic material, for example.

The winding body 30 has two ends, that is a first winding body end 31 and a second winding body end 32. Apart form the winding body 30, however, the coil 13 still comprises further wire portions, so that the first coil end 15 is formed to be spaced from the first winding body 31. The second coil end 16 is likewise formed to be spaced from the second winding body end 32.

It can be furthermore recognized that a first connecting element 11 is connected to the first coil end 15, and a second connecting element 12 is connected to the second coil end 16. The connecting element 11 (see FIG. 2) is formed as a plug-in sleeve. On the contrary, the second connecting element 12 is formed as a flat plug, preferably as a vehicle flat plug.

The two coil ends 15 and 16 are formed to be in parallel to the middle axis (not delineated) of the winding body 30. The coil ends 15 and 16 moreover point into the same direction. In the illustrated case, the coil ends 15 and 16 each point towards the left side. When FIGS. 3 to 4 are observed, it will be clear that the two coil ends 15 and 16 point into the plug-in direction S.

In order to be able to enable such a parallel arrangement of the coil ends 15 and 16 at a simultaneously equal orientation in a corresponding direction, a coil wire portion 19 is formed, which establishes a connection from the first winding body end 31 to the first coil end 15. For this purpose, the coil wire portion 19 is bent at least once.

It may moreover be recognized in FIGS. 1*a* and 1*b* that the first connecting element 11 is formed at the level of the second winding body end 32. This arrangement is likewise established by means of the coil wire portion 19.

The first connecting element 11 is laterally spaced from the winding body 30, but is at the level of the second winding body end 32 in the shown representations. Preferably, the first connecting element is on a perpendicular line to the middle axis of the winding body 30, wherein the perpendicular line intersects the second winding body end 32 or is only slightly spaced apart from this point of intersection.

In FIGS. 2 and 3, the plug-in direction S can be recognized. Thus, both the first connecting element 11 and the second connecting element 12 are mounted and slipped-in the same plug-in direction.

In FIGS. 2 and 3, the first connecting element 11 as well as the second connecting element 12 of the plug-in coil 10 can be recognized. The represented housing 20 covers the plug-in coil 10 almost in its entire extension. Only the second connecting element 12 is not covered in portions by the housing 20.

The housing 20 has a sheathing portion 21 protruding from a housing opening 39 to the outside. The sheathing portion 21 surrounds the connecting element 11 at least in portions. The sheathing portion 21 is formed such that it does not rest completely against the connecting element 11. Rather, a distance is formed between the first connecting element 11 and the sheathing portion 21 so that the formation of a plug-in sleeve is enabled.

The sheathing portion 21 has an access opening 45 pointing into the plug-in direction S. Thus, a plug-in tongue may be inserted into the plug-in sleeve, for example, wherein a good contacting within the plug-in sleeve is enabled due to forming a sheathing portion 21.

The housing 20 further has a first housing portion 22 surrounding the second connecting element 12 at least in portions. Preferably, the first housing portion 22 really surrounds the second connecting element 12 only in portions.

At an outer surface of the housing 20, a guiding device 23 for guiding the housing 20 during assembly in parallel to the plug-in direction S is formed. In the represented example, the guiding device 23 is formed at the housing bottom side 40.

As can be well recognized in FIG. 4 in a side view, the guiding device 23 is formed to be substantially wedge-shaped. Due to the bevelled surface of the wedge-shape, the housing 20 of the plug-in coil element 10 can be mounted simply and be pushed onto an electrical connecting element. The guiding device 23 may in particular be pushed onto a bridge-like contact part 6 of an electrical connecting element 7 (see FIG. 5).

In addition, an arresting device 24 for arresting the housing 20 in parallel to the plug-in direction S is formed. In the present case, the arresting device 24 is located upstream of the guiding device 23 in the plug-in direction S.

The arresting device 24, for example, is formed as a stop element or a stop surface. When the arresting device 24 correspondingly rests against a counter element, further pushing of the housing 20 or the plug-in coil element 10 is effectively prevented. In particular a connecting portion 9 of an electrical connecting element 7 (see FIG. 5) may serve as a counter element of the arresting device 24.

The represented sheathing portion 21 is formed from a shrinking tube material, in particular from polyolefin.

In the represented exemplary embodiment, the guiding device 23 and the arresting device 24 constitute a common, in the present case, a second housing portion 43.

At the housing bottom side 40, an attenuation surface 25 is formed for applying an attenuation element 26. The attenuation element 26 is formed from a soft material, preferably from a rubber material or from a felt material.

The attenuation surface 25 protrudes slightly beyond the housing bottom side 40 so that an assembly or fixing of an attenuation element 26 is enabled in a particularly simple manner. The correct positioning of the attenuation element 26 at the housing 20 thus is secured, since the allocation of the attenuation element 26 to the attenuation surface 25 is clearly obvious.

In the area between the sheathing portion 21 and the first winding body end 31, a third housing portion 44 is formed. This third housing portion 44 predominantly surrounds the area of the coil wire portion 19. Thus, in particular this coil wire portion 19 is protected by means of the housing portion 44, and this area is mechanically stiffened.

The winding body 30 is substantially surrounded by the fourth housing portion 41.

It can be recognized that the housing 20 almost completely surrounds or covers the plug-in coil element 10 by the various housing portions 22, 41, 43 and 44 as well as by means of the sheathing portion 21. Solely the second connecting element 12 is surrounded by the housing 20 only in portions.

The housing 20 is preferably made of polyamide, and is preferably a plastic moulded part.

In FIG. 5, a pane 1, in this case a vehicle pane is illustrated. The pane 1 comprises a substrate 3 and an electrically conductive structure 4. The electrically conductive structure 4 is electrically contacted to the electrical connecting element 7. The electrical connecting element 7 substantially comprises a bridge-like contact part 6, two little feet 5, as well as a plug-in connection 8. The plug-in connection 8 is fixed or connected to the bridge-like contact part 6 by means of a connecting portion 9.

The little feet 5 preferably are connected to the electrically conductive structure 4. This may be performed, for example, by means of a solder connection. It is moreover possible that the connection to the electrically conductive structure 4 is performed by means of an electrically conductive adhesive.

In FIG. 6, a plug-in coil element 10 connected to the electrical connection element 7, and the associated housing 20 are illustrated. The plug-in connection 8 is inserted into the sheathing portion 21 or the opening 45 of the sheathing portion 21 so that a contact establishment with the plug-in sleeve is performed.

The guiding device 23 rests against the bridge-like contact part 6, wherein the arresting device 24 abuts against the connecting portion 9, so that a further movement of the housing in the plug-in direction S is prevented.

The attenuation element 26, however, rests against the substrate (not illustrated). By means of the attenuation element 26, vibration noises are prevented from being generated. Furthermore, the attenuation element 26 serves as a kind of support of the plug-in coil element 10 and the associated housing 20.

LIST OF REFERENCE NUMERALS

1 pane
3 substrate
4 conductive structure
5 little feet
6 bridge-like contact part
7 electrical connecting element
8 plug-in connection
9 connecting portion
10 plug-in coil element
11 first connecting element
12 second connecting element
13 coil
14 coil support
15 first coil end
16 second coil end
19 coil wire portion
20 housing
21 sheathing portion
22 first housing portion
23 guiding device
24 arresting device
25 attenuation surface
26 attenuation element
30 winding body
31 first winding body end
32 second winding body end
39 housing opening
40 housing bottom side
41 fourth housing portion
43 second housing portion
44 third housing portion
45 access opening
S plug-in direction

The invention claimed is:

1. A housing (20) for electrically isolating and mechanically stabilizing a plug-in coil element (10), wherein the plug-in coil element (10) has a coil (13) having a winding body (30), a first coil end (15) and a second coil end (16), as well as a first connecting element (11) for electrically connecting to a connecting element along a plug-in direction(S), and a second connecting element (12) for electrically connecting along the plug-in direction(S), wherein the winding body (30) has a first winding body end (31) and a second winding body end (32), and the first coil end (15) is formed to be spaced from the first winding body end (31), and the second coil end (16) is formed to be spaced from the second winding body end (32), wherein the first connecting element (11) is connected to the first coil end (15), and the second connecting element (12) is connected to the second coil end (16), moreover having protruding from a housing opening (39) to the outside, a sheathing portion (21) surrounding the first connecting element (11) at least in portions, a first housing portion (22) surrounding the second connecting element (12) at least in portions, a guiding device (23) arranged at an outer surface of the housing (20) for guiding the housing (20) during an assembly in parallel to the plug-in direction(S), and an arresting device (24) arranged at the outer surface for arresting the housing (20) in parallel to the plug-in direction(S).

2. The housing (20) according to claim 1, characterized in that an attenuation surface (25) is formed at a housing bottom side (40) for applying an attenuation element (26), wherein the attenuation element (26) is formed from a soft material, preferably from a rubber material or from a felt material.

3. The housing (20) according to claim 1, characterized in that the sheathing portion (21) is formed from a shrinking tube material, in particular from polyolefin.

4. The housing (20) according to claim 1, characterized in that the guiding device (23) and the arresting device (24) constitute a second housing portion (43).

5. The housing (20) according to claim 1, characterized in that in the area between the sheathing portion (21) and the first winding body end (31), a third housing portion (44) is formed surrounding a coil wire portion (19) from the first coil end (15) up to the first winding body end (31).

6. The housing (20) according to claim 1, characterized in that the first housing portion (22) extends starting from the second connecting element (12) at least up to the second winding body end (32).

7. The housing (20) according to claim 1, characterized in that the sheathing portion (21) is at least in portions formed at the level of the second winding body end (32).

8. The housing (20) according to claim 1, characterized in that an access opening (45) of the sheathing portion (21) points into the plug-in direction(S).

9. The housing (20) according to claim 1, characterized by a formation from polyamide, wherein the housing (20) preferably is a plastic moulded part.

10. A plug-in coil element (10) having a housing (20), wherein the plug-in coil element (10) has a coil (13) having a first winding body (30), a first coil end (15) and a second coil end (16), as well as a first connecting element (11) and a second connecting element (12), wherein the winding body (30) has a first winding body end (31) and a second winding body end (32), and the first coil end (15) is formed to be spaced from the first winding body end (31), and the second coil end (16) is formed to be spaced from the second winding body end (32), wherein the first connecting element (11) is connected to the first coil end (15), and the second connecting element (12) is connected to the second coil end (16), wherein the housing (20) is formed according to claim 1, in particular for establishing an electrical connection for a vehicle pane.

11. The plug-in coil element (10) according to claim 10, characterized in that the first connecting element (11) is formed as a plug-in sleeve.

12. The plug-in coil element (10) according to claim 10, characterized in that the second connecting element (12) is formed as a flat plug, preferably as a vehicle flat plug, further preferentially as a standardized vehicle flat plug.

13. A pane (1), in particular a vehicle pane, comprising at least a substrate (3) and an electrically conductive structure (4), wherein the electrically conductive structure (4) is electrically contacted to at least one electrical connecting element (7), wherein the electrical connecting element (7) is connected to a plug-in coil element (10) according to claim 10.

* * * * *